(12) United States Patent
Ganesan et al.

(10) Patent No.: US 10,498,569 B2
(45) Date of Patent: Dec. 3, 2019

(54) SYSTEMS AND METHODS FOR BACKSCATTER COMMUNICATION

(71) Applicant: University of Massachusetts, Boston, MA (US)

(72) Inventors: Deepak Ganesan, Amherst, MA (US); Pengyu Zhang, Palo Alto, CA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 15/631,142

(22) Filed: Jun. 23, 2017

(65) Prior Publication Data

US 2017/0373892 A1 Dec. 28, 2017

Related U.S. Application Data

(60) Provisional application No. 62/353,807, filed on Jun. 23, 2016.

(51) Int. Cl.
*H04L 27/04* (2006.01)
*H04B 1/04* (2006.01)
*H04B 17/318* (2015.01)

(52) U.S. Cl.
CPC .......... *H04L 27/04* (2013.01); *H04B 1/0475* (2013.01); *H04B 17/318* (2015.01)

(58) Field of Classification Search
CPC ...... H04B 1/0075; H04B 1/04; H04B 5/0062; H04L 65/1059; H04L 27/04
USPC ............................... 375/219–222, 300, 295
See application file for complete search history.

(56) References Cited

U.S. PATENT DOCUMENTS

| 8,253,538 | B1* | 8/2012 | Chu ................... | G06K 7/10475 340/10.1 |
| 8,390,688 | B2* | 3/2013 | Freundlich ......... | H04N 21/4122 348/192 |
| 2004/0203478 | A1* | 10/2004 | Scott ................... | G06K 7/0008 455/70 |

(Continued)

OTHER PUBLICATIONS

Zhang, P., et al., "EkhoNet: High Speed Ultra Low-power Backscatter for Next Generation Sensors," Proceedings of the 20th annual international conference on Mobile computing and net-working, pp. 1-12. ACM, 2014.

(Continued)

*Primary Examiner* — Emmanuel Bayard
(74) *Attorney, Agent, or Firm* — Thomas Horstemeyer, LLP

(57) ABSTRACT

Systems and methods for wireless communication are provided. The systems and methods employ a backscatter tag that is configured to shift an incident carrier signal received by the tag to a different frequency band and then transmitting the frequency-shifted carrier signal to a receiver. The frequency band to which the carrier signal is shifted is a band in which interference is minimal or non-existent. Further, the backscatter tag is able to operate in an ultra-low power manner, thereby allowing the tag to be incorporated into components like on-body sensors so that the tag can embed additional information into the carrier signal for transmission and processing by the receiver. Exemplary electronic circuits and systems that utilize a frequency-shifted Backscatter, as well as methods for implementing a frequency-shifted Backscatter, are also provided.

22 Claims, 7 Drawing Sheets

(56) References Cited

U.S. PATENT DOCUMENTS

| | | | | |
|---|---|---|---|---|
| 2005/0253688 | A1* | 11/2005 | Fukuda | G01S 13/758 340/10.4 |
| 2006/0022815 | A1* | 2/2006 | Fischer | G06K 7/0008 340/505 |
| 2006/0238306 | A1* | 10/2006 | Loving | G06K 7/0008 340/10.1 |
| 2006/0252398 | A1* | 11/2006 | Park | G06K 7/0008 455/296 |
| 2008/0100446 | A1* | 5/2008 | Shintani | G06F 21/10 340/572.2 |
| 2008/0146165 | A1* | 6/2008 | Young | H04B 15/06 455/76 |
| 2009/0085738 | A1* | 4/2009 | Darianian | G01S 5/14 340/539.11 |
| 2010/0176918 | A1* | 7/2010 | Turner | G07C 9/00111 340/5.61 |
| 2010/0198034 | A1* | 8/2010 | Thomas | A61B 5/14532 600/365 |
| 2011/0140853 | A1* | 6/2011 | Jung | G06K 7/10217 340/10.1 |
| 2011/0205025 | A1* | 8/2011 | Roesner | G06K 7/10346 340/10.1 |
| 2011/0304431 | A1* | 12/2011 | Farrell | G06K 7/10009 340/10.1 |
| 2013/0076987 | A1* | 3/2013 | Wilson | H04W 16/14 348/731 |
| 2013/0257598 | A1* | 10/2013 | Kawaguchi | G06K 7/10168 340/10.2 |
| 2013/0267943 | A1* | 10/2013 | Hancock | A61B 18/042 606/33 |
| 2014/0022059 | A1* | 1/2014 | Horst | G06K 7/10009 340/10.3 |
| 2014/0285324 | A1* | 9/2014 | Austin | G01S 13/84 340/10.3 |
| 2014/0354443 | A1* | 12/2014 | Roberson | E21B 47/122 340/853.2 |
| 2015/0105038 | A1* | 4/2015 | Lascari | H04B 1/0075 455/230 |
| 2016/0142157 | A1* | 5/2016 | Jeong | H04B 11/00 367/199 |
| 2016/0329931 | A1* | 11/2016 | Mukherjee | H04B 5/0012 |
| 2016/0374019 | A1* | 12/2016 | Park | H04W 52/0229 |
| 2016/0377611 | A1* | 12/2016 | Ma | G01N 33/5438 422/69 |
| 2017/0017874 | A1* | 1/2017 | Park | C10M 169/04 |
| 2017/0085114 | A1* | 3/2017 | Gao | H02J 7/025 |
| 2017/0262669 | A1* | 9/2017 | Tuttle | H04Q 9/00 |
| 2018/0375703 | A1* | 12/2018 | Kellogg | H04L 27/2602 |

OTHER PUBLICATIONS

Zhang, P., et al., Enabling bit-by-bit backscatter communication in severe energy harvesting environments. NSDI, Berkeley, CA, 2014; pp. 345-357.

Zhang, P., et al., "Enabling Practical Backscatter Communication for On-body Sensors," SIGCOMM '16, ACM, Aug. 22-26, 2016 <http://dx.doi.org/10.1145/2934872.2934901>.

[No Author Listed] Federal Communications Commission. Part 15.247 operation within the bands 902-928 MHz, 2400-2483.5 MHz, and 5725-5850 mhz.

Badam, A., et al., "Software defined batteries," Proc. 25th Symposium on Operating Systems Principles, ACM 2015, pp. 215-229.

Bandyopadhyay, S., et al., A 1, 1 nw energy-harvesting system with 544 pw quiescent power for next-generation implants. IEEE Journal of Solid-State Circuits, 49(12):2812-2824, 2014.

Bharadia, D., et al., "Fastforward: fast and constructive full duplex relays." In Proceedings of the 2014 ACM conference on SIGCOMM, pp. 199-210. ACM, 2014.

Bharadia, D., et al., "High throughput wifi backscatter." Proceedings of the 2015 ACM Conference on Special Interest Group on Data Communication, pp. 283-296. ACM, 2015.

Bierman, W. The temperature of the skin surface. Journal of the American Medical Association, 106(14):1158-1162, 1936.

Choi, J.I., et al, "Achieving single channel, full duplex wireless communication." Proceedings of the sixteenth annual international conference on Mobile computing and networking, pp. 1-12. ACM, 2010.

Ensworth, J.F., et al., "Every smart phone is a backscatter reader: Modulated backscatter compatibility with bluetooth 4.0 low energy (ble) devices." 2015 IEEE International Conference on RFID, pp. 78-85. IEEE, 2015.

Farzeen, S., et al, "An ultra-low power ring oscillator for passive uhf rfid transponders," 53rd IEEE International Midwest Symposium on Circuits and Systems (MWSCAS), 2010 , pp. 558-561. IEEE, 2010.

Feeney, L.M., et al., "How do the dynamics of battery discharge affect sensor lifetime?" 11th Annual Conference on Wireless On-demand Network Systems and Services (WONS), 2014 , pp. 49-56. IEEE, 2014.

Furset, K., et al., High pulse drain impact on cr2032 coin cell battery capacity. <https://cms.edn.com/contenteetimes/documents/schweber/c0924/c0924post.pdf>, 2011.

Gollakota, S., et al, "Interference alignment and cancellation." In ACM SIGCOMM Computer Communication Review, vol. 39, pp. 159-170. ACM, 2009.

Gollakota, S., et al., "Clearing the rf smog: making 802.11 n robust to cross-technology interference." ACM SIGCOMM Computer Communication Review, 41(4):170-181, 2011.

Gollakota, S., et al., "The emergence of rf-powered computing." Computer, 47(1):32-39, 2014.

Gollakota, S., et al., "Zigzag decoding: combating hidden terminals in wireless networks," Master's Thesis, Jun. 2008, © MIT 2008.

Gummeson, J., et al., "Flit: a bulk transmission protocol for rfid-scale sensors." In Proceedings of the 10th international conference on Mobile systems, applications, and services, pp. 71-84. ACM, 2012.

Halperin, D., et al., "Taking the sting out of carrier sense: interference cancellation for wireless lans." In Proceedings of the 14th ACM international conference on Mobile computing and networking, pp. 339-350. ACM, 2008.

Hassanieh, H., et al., "Securing rfids by randomizing the modulation and channel." NSDI '15, May 4-6, 2015. <https://www.usenix.org/conference/nsdi15/technical-sessions/presentation/hassanieh>.

Hu, P., et al., "Laissez-faire: Fully asymmetric backscatter communication." In Proceedings of the 2015 ACM Conference on Special Interest Group on Data Communication, pp. 255-267. ACM, 2015.

Hu, P., et al., "Leveraging interleaved signal edges for concurrent backscatter." In Proceedings of the 1st ACM workshop on Hot topics in wireless, pp. 13-18. ACM, 2014.

Jain, M., et al., "Practical, real-time, full duplex wireless." In Proceedings of the 17th annual international conference on Mobile computing and networking, pp. 301-312. ACM, 2011.

Kamalinejad, P., et al., "An ultra-low-power cmos voltage-controlled ring oscillator for passive rfid tags." 2014 IEEE 12th International New Circuits and Systems Conference (NEWCAS), , pp. 456-459. IEEE, 2014.

Katti, S., et al., "XORS in the air: practical wireless network coding." In ACM SIGCOMM Computer Communication Review, vol. 36, pp. 243-254. ACM, 2006.

Katti, S., et al., "XORS in the air: practical wireless network coding." IEEE/ACM Transac. Networking, Jun. 2008, v. 16, pp. 497-510.

Kellogg, B., et al., "Wi-Fi backscatter: internet connectivity for rf-powered devices," SIGCOMM '14, Proceedings of the 2014 ACM conference on SIGCOMM, pp. 607-618. ACM, Aug. 17-22, 2014.

Kellogg, B., et al., "Passive Wi-Fi: Bringing Low Power to Wi-Fi Transmissions," NSDI '16, Proc. of the 13th USENIX Symposium on Networked Systems Design and Implementation, Mar. 16-18, 2016.

Lee, K.K., et al., "A study of low-power crystal oscillator design." In NORCHIP, 2013, pp. 1-4. IEEE, 2013.

Lin, K. C.-J., et al, Ziptx: Harnessing partial packets in 802.11 networks. In Proceedings of the 14th ACM international conference on Mobile computing and networking, pp. 351-362. ACM, 2008.

(56) References Cited

OTHER PUBLICATIONS

Liu, V., et al., "Ambient backscatter: wireless communication out of thin air." In ACM SIGCOMM Computer Communication Review, vol. 43, pp. 39-50. ACM, 2013.
Liu, V., et al, "Enabling instantaneous feedback with full-duplex backscatter." In Proceedings of the 20th annual international conference on Mobile computing and networking, pp. 67-78. ACM, 2014.
Mercier, P. P., et al., "Energy extraction from the biologic battery in the inner ear." Nature biotechnology, 30 (12):1240-1243, 2012.
Nikitin, P.V., et al., "Antennas and propagation in uhf rfid systems." IEEE RFID; 2008 conference proceedings (Las Vegas, NV, Apr. 16-17, 2008).
Nikitin, P.V., et al., "Power Reflection Coefficient Analysis for; Complex Impedances in RFID Tag Design," IEEE Transactions on Microwave Theory and Techniques, vol. 53, No. 9, Sep. 2005; pp. 2721-2725.
Pantelopoulos, A., et al., A survey on wearable sensor-based systems for health monitoring and prognosis. IEEE Transactions on Systems, Man, and Cybernetics, Part C: Applications and Reviews,, 40(1):1-12, 2010.
Park, S., et al., "A 95nw ring oscillator-based temperature sensor for rfid tags in 0.13?m cmos." IEEE International Symposium on Circuits and Systems, 2009. ISCAS 2009., pp. 1153-1156. IEEE, 2009.
Parks, A. N., et al., "Turbocharging ambient backscatter communication," Proceedings of the 2014 ACM conference on SIGCOMM, pp. 619-630. ACM, 2014.
Pozar, D.M., Microwave Engineering. John Wiley & Sons, 2009; Chapters 1 and 5, pp. 1-47 and 228-271.
Qu, G., et al., "Temperature-aware cooperative ring oscillator PUF." 2009. HOST'09. IEEE International Workshop on Hardware-Oriented Security and Trust, pp. 36-42. IEEE, 2009.
Rao, K. S., et al, "Impedance matching concepts in rfid transponder design." 2005. Fourth IEEE Workshop on Automatic Identification Advanced Technologies, pp. 39-42. IEEE, 2005.
Sample, A. P., et al,. "Design of an aid-based battery-free programmable sensing platform." Instrumentation and Measurement, IEEE Transactions on Instrumentation and Measurement, 57(11):2608-2615, 2008.
Song, F., et al. "Ultra-low-power clock generation circuit for epc standard uhf rfid transponders." Electronics Letters, 44 (3)199-201, 2008.
Talla, V., et al. Powering the next billion devices with wi-fi. arXiv preprint arXiv:1505.06815, 2015.
Wang, J., et al, "Dude, where's my card?: Rfid positioning that works with multipath and non-line of sight." In ACM SIGCOMM Computer Communication Review, vol. 43, pp. 51-62. ACM, 2013.
Wang, J., et al, "Efficient and reliable low-power backscatter networks." In Proceedings of the ACM SIGCOMM 2012 Conference on Applications, technologies, architectures, and protocols for computer communication, pp. 61-72. ACM, 2012.
Wang, J., et al., "Rf-compass: robot object manipulation using rfids." In Proceedings of the 19th annual international conference on Mobile computing & networking, pp. 3-14. ACM, 2013.
Wang, J., et al., "Rf-idraw: virtual touch screen in the air using RF signals." In Proceedings of the 2014 ACM conference on SIGCOMM, pp. 235-246. ACM, 2014.
Yeager, D., et al. "A 9 ?a, addressable gen2 sensor tag for biosignal acquisition." IEEE Journal of Solid-State Circuits, 45(10):2198-2209, 2010.
Yip, M., et al., "A fully-implantable cochlear implant sock with piezoelectric middle-ear sensor and arbitrary waveform neural stimulation." IEEE Journal of Solid-State Circuits, 50(1):214-229, 2015.
Zappi, P., et al., "Activity recognition from on-body sensors: accuracy-power trade-off by dynamic sensor selection." In Wireless sensor networks, pp. 17-33. Springer, 2008.
Zhang, P., et al., Blink: A high throughput link layer for backscatter communication. In Proceedings of the 10th international conference on Mobile systems, applications, and services, pp. 99-112. ACM, 2012.

\* cited by examiner

SYSTEMS AND METHODS FOR BACKSCATTER COMMUNICATION

CROSS REFERENCE TO RELATED APPLICATION

The present application claims priority to and the benefit of U.S. Provisional Application No. 62/353,807, filed on Jun. 23, 2016, and titled "Methods and Systems for Improving Performance of a Backscatter Tag," the content of which is incorporated herein by reference in its entirety.

GOVERNMENT RIGHTS

This invention was made with Government support under Grant Nos. CNS-1218586, CNS-1217606, and CNS-1239341, each of which was awarded by the National Science Foundation, and Grant No. 1U54EB020404 awarded by the National Institute of Health. The Government has certain rights in the invention.

FIELD

The present application relates to systems and methods for providing wireless data communication, and more particularly relates to the use of frequency-shifted Backscatter to provide an ultra-low power way by which data can be wirelessly communicated.

BACKGROUND

With every passing day, the world becomes more digitally interconnected. The Internet of Things (IoT) has led to the exchange of data from a plethora of objects. The data from one object is measured, entered, determined or otherwise formulated at one location, and the data is then transferred to another location, such as to another object, the cloud, or other place that can receive, store, process, or otherwise use the data from the first object. The transfer is often conducted in a wireless manner. This boon in data collection and sharing has led to new measurements and data being collected by objects and at locations where collection was not previously easy to achieve.

Today, people carry several mobile and wearable devices that are embedded with various sensors and are connected to the Internet infrastructure via wireless communication means, including but not limited to Wi-Fi and Bluetooth. The devices include activity trackers (e.g., Fitbits® and Misfit Shines), smartphones (e.g., iPhones and Android phones), and smartwatches (e.g., Apple Watches and Samsung Gear watches), among others. Additionally, sensors capable of transferring data via the Internet infrastructure are also being incorporated into clothing and/or being applied directly to humans to allow for further data collection and sharing. For example, biometric sensors, electrodes, and the like are being embedded into athletic apparel, can be temporarily or more permanently attached to humans. Temporary attachment to humans can include using a temporary adhesive to apply a sensor(s) or the like to human skin for a limited period of time, while more permanent attachment to humans can include printing or otherwise applying a tattoo-like sensor(s) onto human skin. Given the interest level in collecting and sharing data for human consumption, analysis, and benefit, the number of objects into which sensors will be incorporated to collect and share data will only increase.

A limiting factor associated with collecting and sharing data, however, is the amount of power needed to operate these functionalities in the devices in which the sensors and the like are incorporated while keeping the sensors small and wireless. One of the biggest bottlenecks to collecting and sharing data over a sustained period of time is the power output necessary to wirelessly transmit the data. Wi-Fi and Bluetooth (including Bluetooth Low Energy, or BLE) are currently the most popular ways by which to wirelessly transmit data, with Bluetooth Low Energy (BLE) generally being considered the most low-power and efficient wireless data transmission solution. When in active mode, BLE uses tens of milliwatts, which is three orders of magnitude more power compared to sensors like an accelerometer, and an order of magnitude higher than even low-power cameras. While tens of milliwatts may not sound like much, that power consumption adds up quickly since it occurs whenever BLE is in active mode, leading to battery drain, inaccurate data transmission, and/or ultimate failure to transmit data.

Accordingly, there is a need to decrease the amount of power associated with transmitting data wirelessly to reduce the bottleneck that currently exists for collecting and sharing data wirelessly.

SUMMARY

Systems and methods for implementing a frequency-shifted Backscatter as part of wirelessly transmitting data are disclosed in the present application. More specifically, a backscatter tag is used as an intermediate component between a device configured to transmit an incident carrier signal that is representative of some data, and a receiver configured to receive a carrier signal that relates to the data of the incident carrier signal. Transmitters and receivers can often be existing devices capable of wireless transmission, such as smartphones, smartwatches, tablets, fitness trackers, activity bands, etc. The carrier signal received by the receiver can include the incident carrier signal, with the signal being shifted to a different frequency band than it was initially transmitted by the transmitter. Further, the carrier signal received by the receiver can include additional information embedded into the carrier signal, for instance information measured, sensed, or otherwise provided by the backscatter tag.

By way of example, in a computing device ecosystem, the transmitter can be a first Bluetooth or Wi-Fi-enabled device, such as a smartphone, the backscatter tag can be a wearable sensor disposed on a person, and the receiver can be a second Bluetooth or Wi-Fi-enabled device, such as a smartwatch. The smartphone can generate some data, transmit that data to the wearable sensor using Bluetooth or Wi-Fi, for instance in the form of a carrier signal, and the wearable sensor can receive the carrier signal. The wearable sensor can include a backscatter tag, which can be used to shift a frequency band in which the carrier signal was originally transmitted by the smartphone. In some embodiments, the shift can be to the next lower or higher frequency band that does not overlap with the frequency band in which the initial carrier signal was transmitted. Further, the backscatter tag can embed data from the wearable sensor into the signal as well. The backscatter tag can then transmit—or reflect in view of Backscatter nomenclature—the frequency-shifted carrier signal to the smartwatch. The smartwatch can decode the signal and display, use, or otherwise provide the transmitted data from the carrier signal. Notably, not only do the provided for systems and methods enable for cleaner signals, but they also provide for systems and methods that can be operated in an ultra-low power manner, e.g., using approximately 50 microwatts or less of power to receive, shift, and transmit/reflect the signal.

In one exemplary embodiment of a method for transmitting data, the method includes receiving a carrier signal, which is transmitted in a first frequency band, shifting a frequency band in which the carrier signal is transmitted to a second frequency band, and transmitting the carrier signal in the second frequency band. The second frequency band is substantially free of signal interference.

The second frequency band can be a predetermined frequency band. For example, the predetermined frequency band can be at either a channel at a next lower non-overlapping frequency band of a channel in which the received carrier signal is transmitted, or at a next higher non-overlapping frequency band of the channel in which the received carrier signal is transmitted. The predetermined frequency band can be a fixed frequency band. In some embodiments a difference between the first frequency band and the second frequency band can be approximately 20 megahertz.

Additional information can be added to the carrier signal that is received and subsequently transmitted. For example, the method can include performing on-off keying to transfer information to the carrier signal that is transmitted in the second frequency band. This can occur before, during, or after the frequency-shift of the carrier signal occurs.

The action of transmitting the carrier signal in the second frequency band can have a power consumption that is at or below about 50 microwatts. In some embodiments, a backscatter tag can be operated to shift the frequency band in which the carrier signal is transmitted to the second frequency band. The backscatter tag itself can be configured to operate at approximately 50 microwatts or lower when shifting the frequency band in which the carrier signal is transmitted to a second frequency band. In such low-power embodiments, the backscatter tag can include a ring oscillator.

In some embodiments, each of the actions of receiving a carrier signal, shifting a frequency band in which the carrier signal is transmitted to a second frequency band, and transmitting the carrier signal in the second frequency band can be performed by a sensor located on a body of a user.

Some embodiments of the method can include actions performed by other components, such as transmitters or receivers used in conjunction with something like a backscatter tag and/or a backscatter tag incorporated as part of a sensor. Such transmitters or receivers can be existing smart devices (e.g., smartphones, smartwatches, tablets, activity trackers, fitness bands, wearable or other on-body sensors, etc.) that are already configured to wirelessly transmit data. Thus, some embodiments of the method can include transmitting the carrier signal in the first frequency band, with the carrier signal being the carrier signal that is received, and receiving the carrier signal that is transmitted in the second frequency band. In such embodiments, transmitting the carrier signal in the first frequency band can be performed by a first smart device configured to transmit a carrier signal by at least one of Bluetooth or Wi-Fi, and receiving the carrier signal that is transmitted in the second frequency band can be performed by a second smart device configured to receive a carrier signal by at least one of Bluetooth or Wi-Fi. For example, the first smart device can transmit the carrier signal by either Bluetooth or Wi-Fi, and the second smart device receives the carrier signal by either Bluetooth or Wi-Fi, with the selection of Bluetooth or Wi-Fi being the same for the first and second smart devices.

In some exemplary embodiments, the actions of transmitting the carrier signal in the first frequency band and transmitting the carrier signal in the second frequency band can be performed without amplitude-shift keying or frequency-shift keying to transfer information in either the first or second frequency bands. The action of transmitting the carrier signal in the first frequency band can be performed by multiple smart devices. In such instances, the smart devices can be configured to transmit in the first frequency band without causing significant signal interference for the carrier signal transmitted in the second frequency band. Further, the action of receiving the carrier signal that is transmitted in the second frequency band can be performed by multiple smart devices. In such instances, the smart devices can be configured to measure a strength of a backscattered bit of the received carrier signal, and the strength of each of the backscattered bits can be added to determine an actual bit of the carrier signal transmitted in the second frequency band.

One exemplary embodiment a backscatter tag includes a radio frequency (RF) transistor, transmission logic, and a clock generator. The transmission logic, also referred to as a modulator, is configured to receive data to be transmitted and to toggle the RF transistor based on the data to be transmitted. The clock generator is operatively connected to the transmission logic and is configured to shift frequency of an incident carrier from a first frequency band to a second frequency band, with the second frequency band being substantially free of signal interference.

The second frequency band to which the carrier is shifted can be a predetermined frequency band. In some embodiments, the predetermined frequency band can be located at either a channel at a next lower non-overlapping frequency band of a channel in which the incident carrier is transmitted, or a next higher non-overlapping frequency band of the channel in which the incident carrier is transmitted. The predetermined frequency band can be a fixed frequency band.

The clock generator can be configured to shift the frequency of the incident carrier from the first frequency band to the second frequency band prior to transmitting data to the RF transistor. In some embodiments, the tag can include an antenna that is operatively coupled to the RF transistor. In some such embodiments, the clock generator can be configured to reflect multiple incident signals at the same time, with the antenna being configured to resonate with the multiple incident signals that are reflected at the same time.

The RF transistor can be configured to transmit a signal across any frequency band. Meanwhile, the clock generator can be configured to operate at approximately 50 microwatts or lower to shift the frequency band in which the carrier signal is transmitted to the second frequency band. In such ultra-low power configurations, the clock generator can include a ring oscillator. The ring oscillator can include, for example, an odd number of inverters electrically coupled in a serial sequence. Alternatively, or additionally, the ring oscillator can include at least one RC circuit configured to provide for a delay of the clock generator.

The transmission logic can be configured to perform bit-level decoding of the incident carrier. Alternatively, or additionally, the transmission logic can be configured to perform packet-level decoding of the incident carrier. The tag can be configured to transmit the incident carrier with a power consumption of the tag being at or below about 50 microwatts. In some embodiments, the transmission logic and the clock generator can be configured to operate at approximately 0.8 Volts or less.

BRIEF DESCRIPTION OF DRAWINGS

This disclosure will be more fully understood from the following detailed description taken in conjunction with the accompanying drawings, in which.

Figure 1:
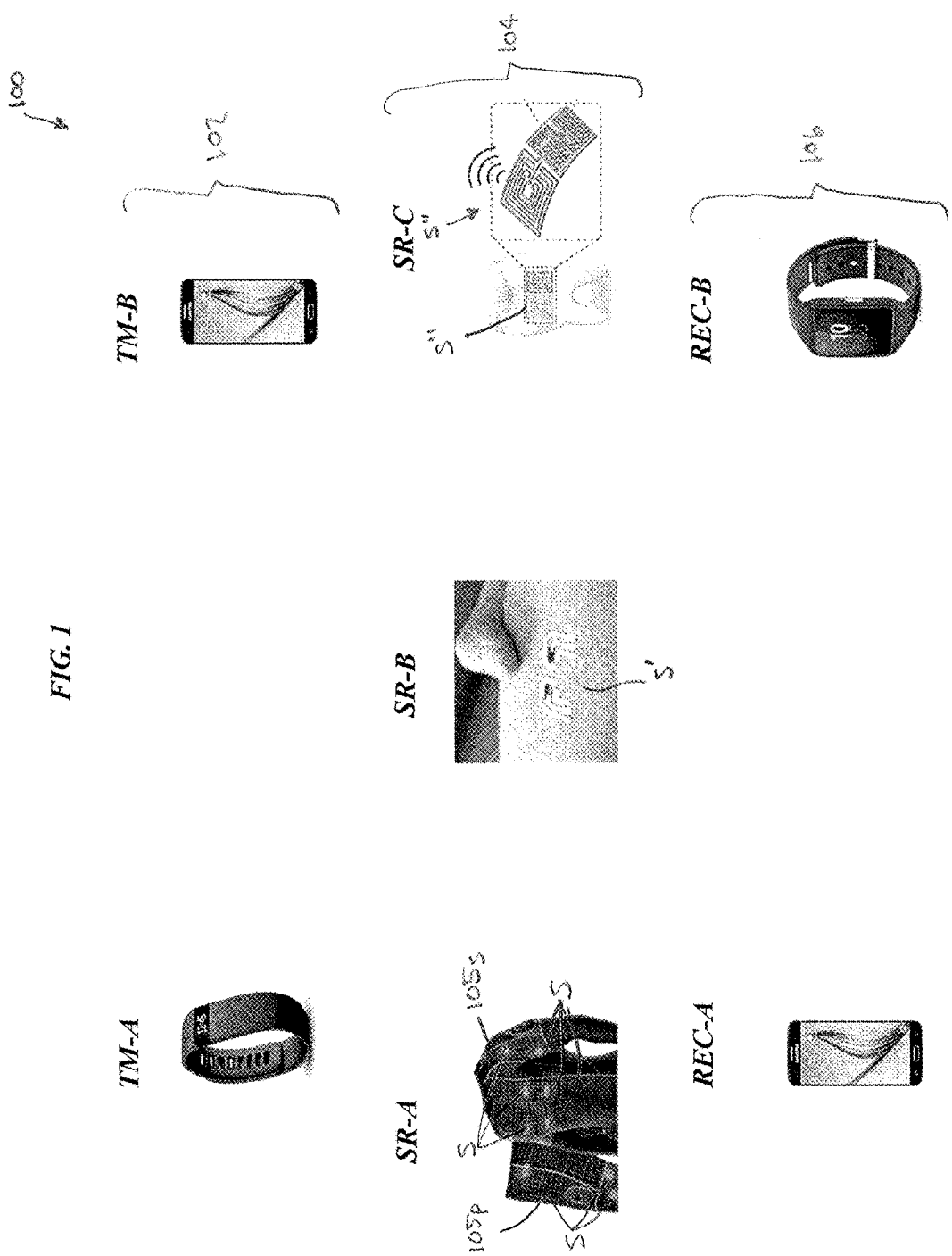
FIG. 1 is a schematic diagram of one exemplary embodiment of a computing device ecosystem, and includes the following non-limiting exemplary embodiments of devices in the computing device ecosystem.
Figure 2:
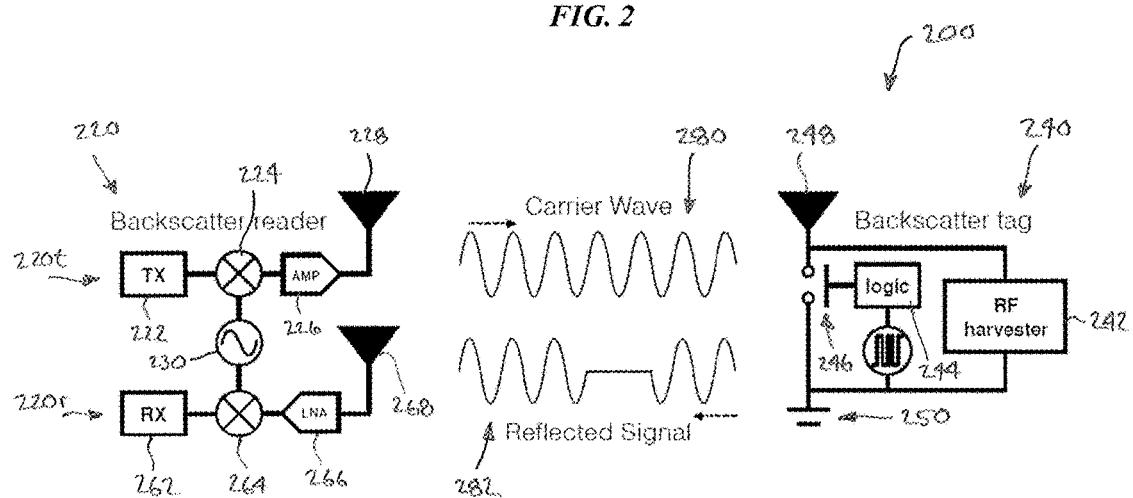
Figure 3:
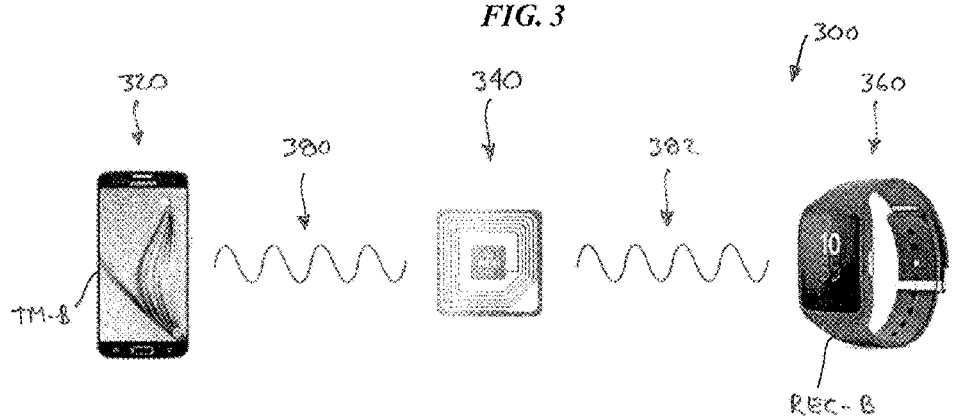
Figure 4:
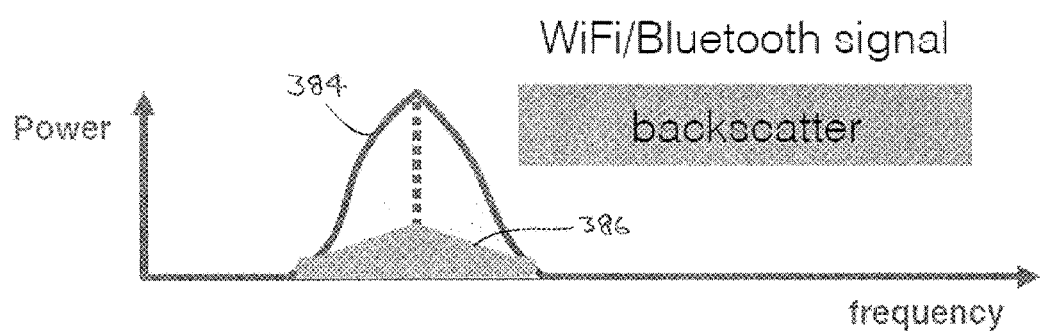
Figure 5:
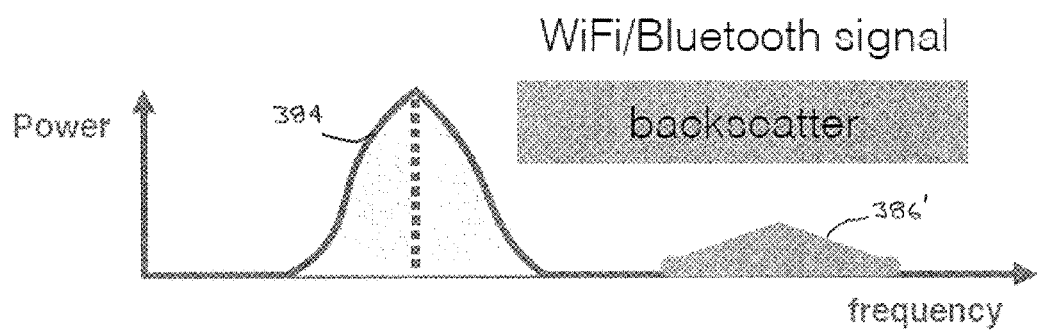
Figure 6:
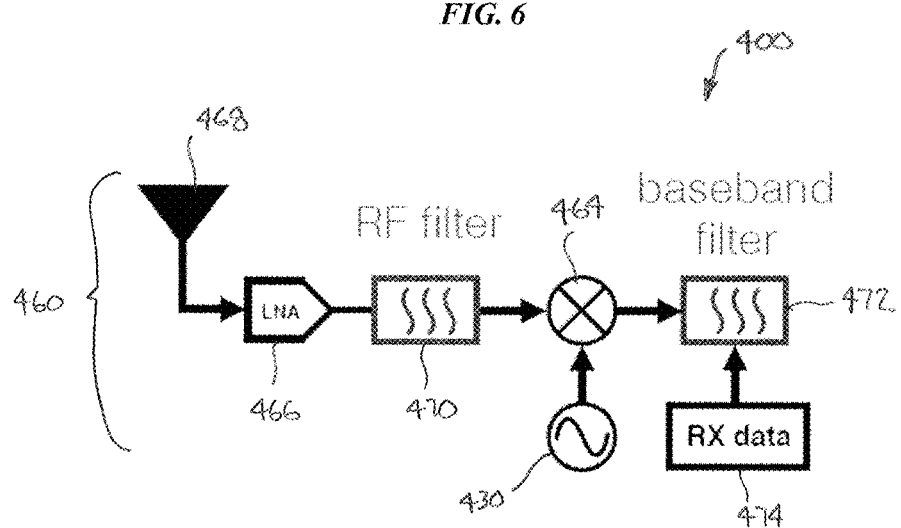
Figure 7:
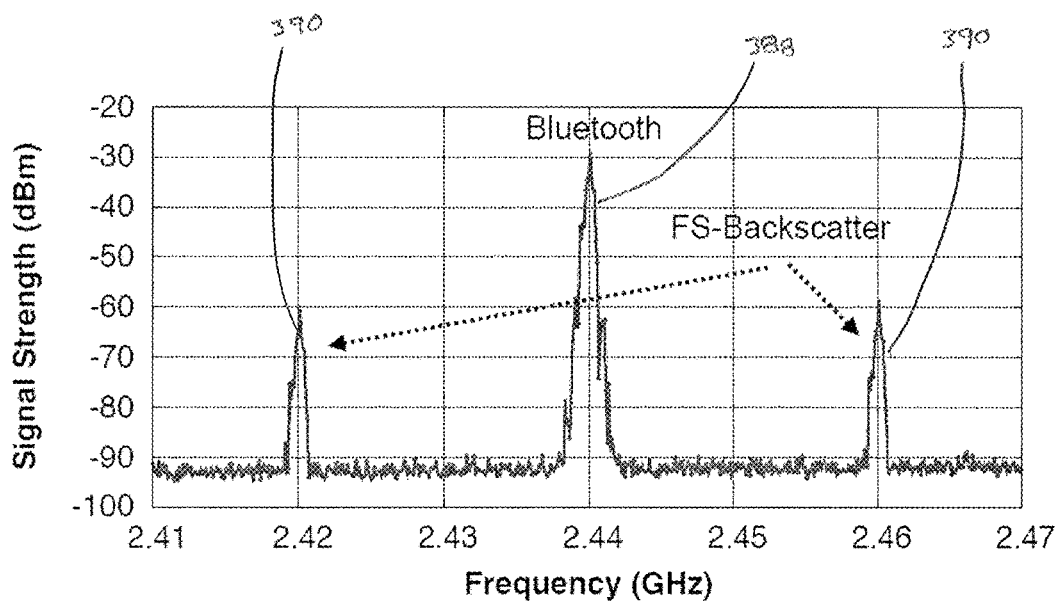
Figure 8:
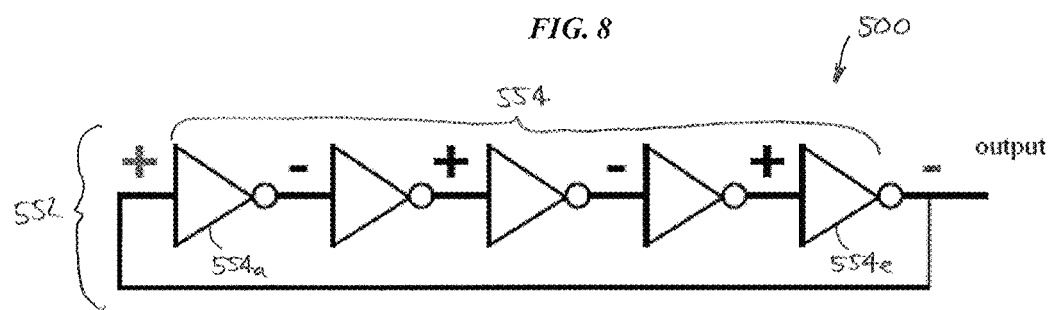
Figure 9:
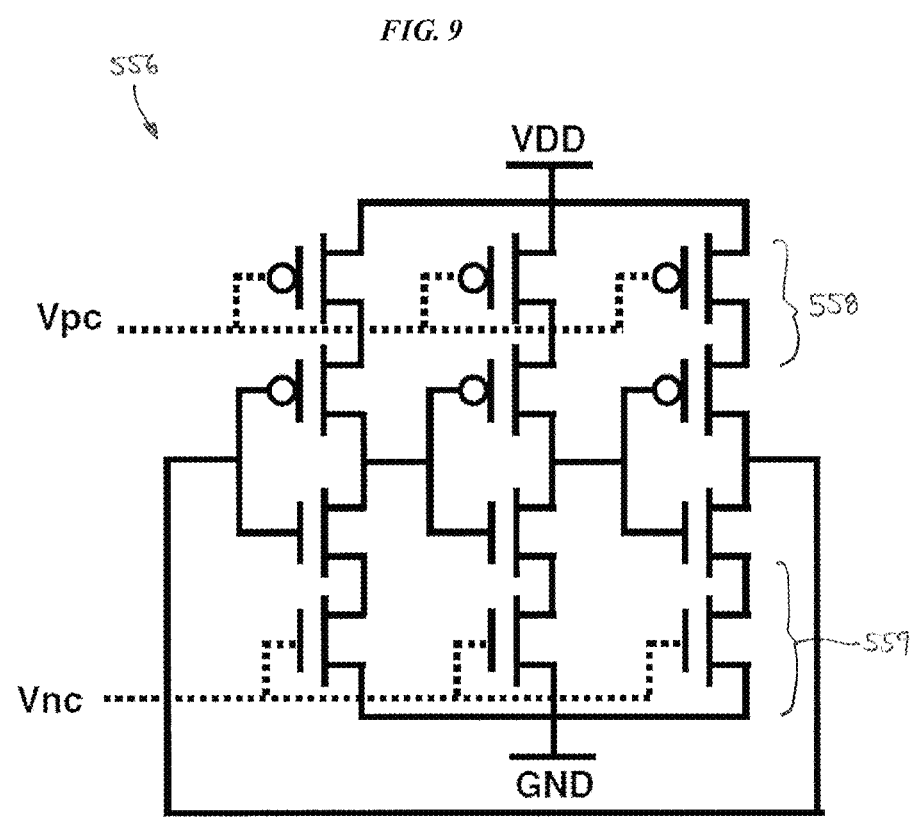
Figure 10:
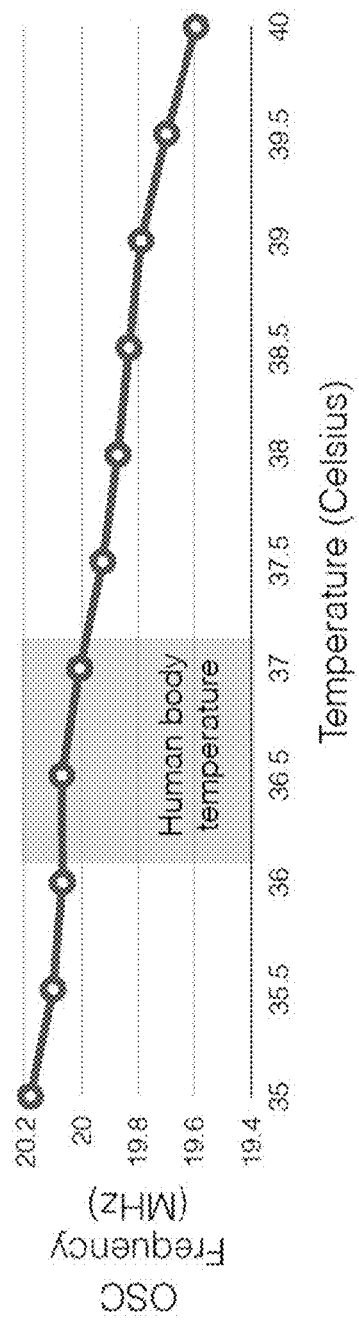
Figure 11:
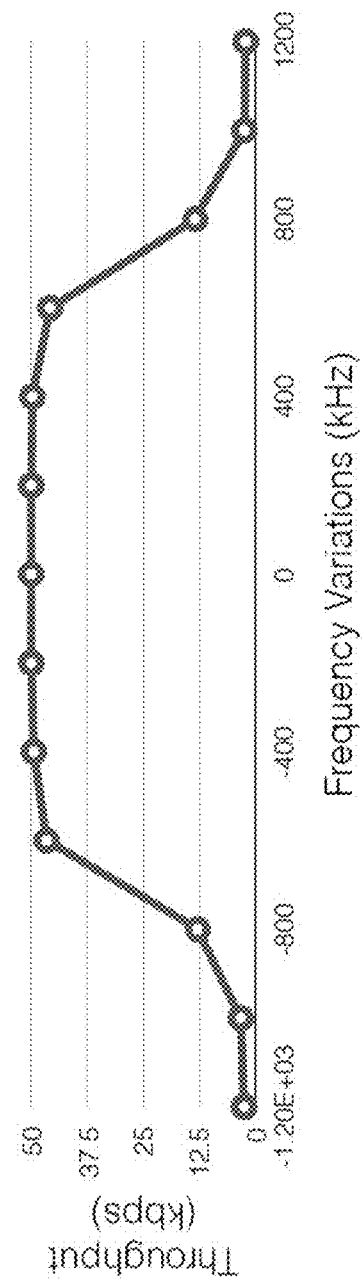
Figure 12:
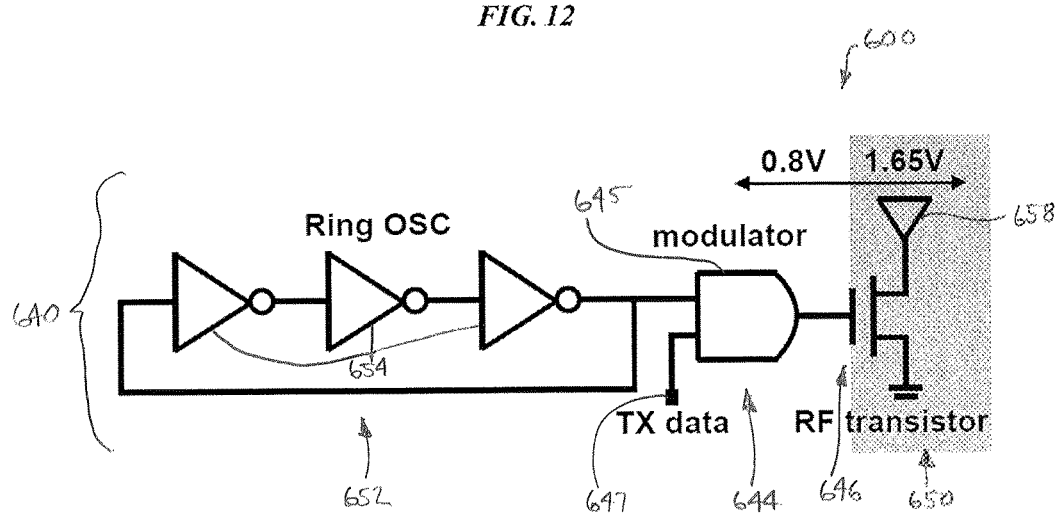
Figure 13:
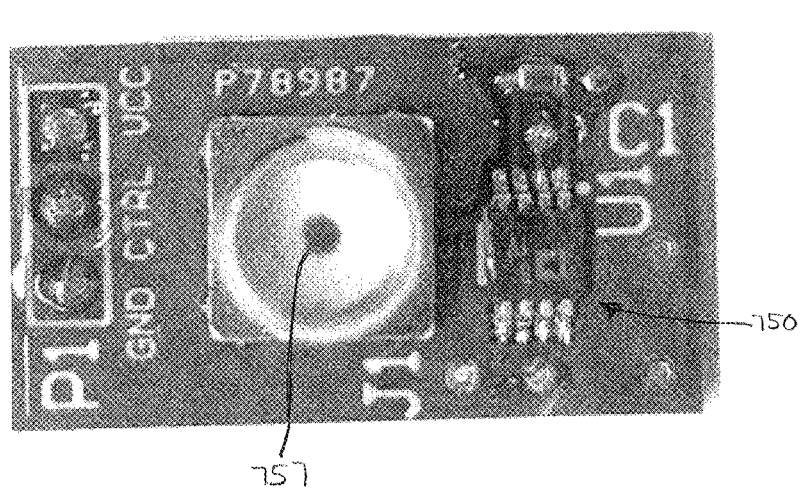

TM-A is a perspective view of one exemplary embodiment of a transmitter capable of transmitting a carrier signal, the transmitter being a fitness activity tracker;

TM-B is a front view of another exemplary embodiment of a transmitter capable of transmitting a carrier signal, the transmitter being a smartphone;

SR-A is a perspective view of one exemplary embodiment of sensors each having a backscatter tag incorporated therewith, the sensors being embedded in apparel;

SR-B is a perspective view of one exemplary embodiment of a sensor having a backscatter tag incorporated therewith, the sensor being adhered to human skin;

SR-C is a perspective view of another exemplary embodiment of a sensor having a backscatter tag incorporated therewith, the sensor being adhered to a tooth;

REC-A is a front view of one exemplary embodiment of a receiver capable of receiving a carrier signal, the receiver being a smartphone; and REC-B is a perspective view of another exemplary embodiment of a receiver capable of receiving a carrier signal, the receiver being a smartwatch;

FIG. 2 is a schematic electronic diagram of one exemplary embodiment of a combination of a backscatter reader, which is capable of both transmitting a carrier signal and receiving a carrier signal, and a backscatter tag;

FIG. 3 is a schematic diagram of one exemplary embodiment of a combination of a transmitter capable of transmitting a carrier signal, a sensor having a backscatter tag incorporated therewith, and a receiver capable of receiving a carrier signal, the transmitter, sensor, and receiver being in wireless communication, the transmitter being the smartphone of TM-B, and the receiver being the smartwatch of REC-B, both of FIG. 1;

FIG. 4 is a graph illustrating an instance in which a backscatter signal from a backscatter tag is transmitted in a similar frequency band as a Bluetooth and/or Wi-Fi signal generated by one or both of a transmitter and a receiver;

FIG. 5 is a graph illustrating an instance in which a backscatter signal from a backscatter tag, such as those provided for herein, is transmitted in a different frequency band as a Bluetooth and/or Wi-Fi signal generated by one or both of a transmitter and a receiver;

FIG. 6 is a schematic electronic diagram of one exemplary embodiment of an object capable of being a transmitter and/or a receiver;

FIG. 7 is a graph illustrating an incident signal transmitted by Bluetooth using a transmitter and two reflected signals based on the incident signal using a backscatter tag;

FIG. 8 is a schematic electronic diagram of one exemplary embodiment of an oscillator of a frequency-shifting backscatter tag;

FIG. 9 is a schematic electronic diagram of an inverter of the oscillator of FIG. 8;

FIG. 10 is a graph illustrating a change in oscillating frequency in response to a change in temperature for the oscillator of FIG. 8;

FIG. 11 is a graph illustrating a change in data throughput in response to a change in oscillation frequency in view of the change in oscillating frequency illustrated in FIG. 10;

FIG. 12 is a schematic electronic diagram of one exemplary embodiment of a frequency-shifting backscatter tag; and FIG. 13 is a top view of one exemplary embodiment of a frequency-shifting backscatter radio analog front end.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose. Still further, to the extent electronic circuits and other diagrams are provided for in the present disclosure, a person skilled in the art, in view of the present disclosures, will understand a plethora of different ways by which the same purpose or functions can be achieved using different components and configurations of an electronic circuit. The illustrated circuits and other diagrams are in no way limiting of the types of set-ups that can be used to perform the various electronic functions, such as transmitting a signal, shifting a frequency of that signal, and receiving the frequency-shifted signal. Additionally, in a number of instances, various terms understood or otherwise known to those skilled in the art are used interchangeably, including, by way of non-limiting example, terms like "signal" and "wave."

The systems and methods provided for in the present disclosure allow for devices connected in a computer device ecosystem to communicate wirelessly in an ultra-low power manner without suffering from any significant signal degradation that can negatively impact the distance at which the data transfer can occur and/or the rate at which the data transfer can occur. The described systems and methods employ a backscatter tag that enables the use of existing devices having Bluetooth and/or Wi-Fi capabilities to be used as data transmitters and receivers. While devices in a computer device ecosystem are capable of wirelessly transmitting data, their performance is bottlenecked by the amount of power needed to actively transmit the data. Transmitting data wirelessly over an extended period of time (e.g., hours) can become a serious drain on power (e.g., battery life). Further, the set-up of existing systems and methods can be plagued by signal interference issues when attempting to transmit data in ways that reduce the amount of power needed to operate the devices. Interference issues result in severe limitations in the distance over which data can be transferred, and the amount of data that can be transferred over a period of time.

The systems and methods provided for in the present disclosure address these issues by providing for a backscatter tag that is uninhibited by interference issues, and consumes substantially less power than is typically used by devices transmitting and receiving data wirelessly. The backscatter tags of the present disclosure create a frequency-shifted Backscatter ("FS-Backscatter") in which an incident carrier signal or wave traveling in a first frequency band (e.g., channel) from a transmitter or carrier (e.g., a first smart device that generates the incident carrier signal to communicate some measured or known data) is received by the tag, and is subsequently shifted by the tag to a second frequency band. The shifted signal is then transmitted across the second frequency band, typically with additional data provided by the tag. The second frequency band can be a predetermined and/or fixed band. For example, in one exemplary embodiment provided for herein, the second frequency band is at least 20 megahertz greater or less than the first frequency band. A receiver or decoder (e.g., a second smart device) is tuned to the second frequency band so it can receive the clean signal that was shifted and transmitted by the tag, the clean signal including the signal from the transmitter and information added by the backscatter tag, if any.

Computing Device Ecosystem

FIG. 1 illustrates an exemplary embodiment of a computing device ecosystem 100 in which the present disclosures related to backscatter tags can be used. The ecosystem 100 includes a plurality of objects or devices capable of collecting, gathering, or otherwise generating data and transmitting that data to another location(s) and/or object(s)/device(s) that is (are) capable of receiving at least some portion of the transmitted data. It should be understood that the computing device ecosystem 100 can include any number and type of interconnected computer devices or other devices and/or locations (e.g., the cloud) capable of collecting, gathering, or otherwise generating and transmitting data. For example, the ecosystem 100 can refer to the Internet of Things (IoT), a home network, an office network, or any set of interconnected computing devices.

In the illustrated computing device ecosystem 100, data is transferred wirelessly, although some objects in a computing device ecosystem may be connected in a wired configuration. The computing devices in the ecosystem 100 can include devices that are capable of both transmitting and receiving data, such as various smart devices and sensors. In some instances, although a particular component (e.g., computer device) of a computing device ecosystem is capable of both transmitting and receiving data, only one of those functions may be operational at a time to achieve peak performance. As shown, the illustrated devices TM-A and TM-B of FIG. 1 are transmitters 102 (sometimes referred to as carriers), the illustrated devices SR-A, SR-B, and SR-C of FIG. 1 are sensors 104 (which serve as backscatter tags, as described in greater detail below), and the illustrated devices REC-A and REC-B of FIG. 1 are receivers 106 (sometimes referred to as decoders). A person skilled in the art will recognize that devices such as transmitters can likewise be configured to be receivers, and devices such as receivers can likewise be configured to be transmitters. In fact, in the illustrated embodiments of FIG. 1, each of the provided transmitters 102 and receivers 106 are capable of operating as receivers and transmitters, respectively.

The exemplary transmitter TM-A is an activity tracker or fitness band (e.g., Fitbits® and Misfit Shines), and the exemplary transmitter TM-B is a smartphone (e.g., iPhones and Android phones). Further, the exemplary receiver REC-A is a smartphone (e.g., iPhones and Android phones), and the exemplary receiver REC-B is a smartwatch (e.g., Apple Watches and Samsung Gear watches). Any activity trackers, wearable devices, smartphones, smartwatches, and tablets or the like capable of receiving and/or transmitting data can be used in conjunction with the present disclosures, as can other objects capable of being connected to the IoT. Components and devices such as activity trackers, smartphones, smartwatches, tablets, and the like can be generally referred to as "smart devices." A person skilled in the art will recognize other types of "smart devices" that exist and can be used in conjunction with the present disclosures in the capacity of a transmitter and/or a receiver. Often smart devices, and thus the transmitters and receivers provided for the in the present disclosure, include one or more sensors that allow data to be collected, gathered, or otherwise generated, and the data can then be wirelessly transmitted and/or received. Moreover, smart devices can be equipped with one or more processors, memories, and components configured to allow for wireless communication with other devices that are part of the ecosystem 100.

Smart devices can be configured to communicate with other objects, devices, locations (e.g., the cloud), and the like of the computing device ecosystem 100 using any number of wireless data transfer techniques known to those skilled in the art. In some embodiments, the communications means includes Bluetooth (or Bluetooth Low Energy (BLE)) and/or Wi-Fi radios and antennas. Other ways of communication can also be used in conjunction with the present disclosures, such as ZigBee, industrial, scientific, and medical (ISM)-radio bands, and others known to those skilled in the art. Still further, the transmitters 102 and receivers 106 can include built-in sensors such as cameras, microphones, accelerometers, thermometers, gyroscopes, and other sensors known to those of skill in the art for purposes of collecting and/or measuring data.

Still with reference to FIG. 1, the exemplary sensors SR-A are sensors S embedded or otherwise associated with apparel, as shown a shirt 105s and pants 105p, to create biometric clothing and/or adhered to skin. Further, the exemplary sensor SR-B is a sensor tattoo S', and the exemplary sensor SR-C is a tooth sensor S". The sensors 104 can be configured to measure many different parameters, and can include any number and type of lower-energy sensors such as on-body sensors, miniature implantable sensors, thin and flexible wearables, and others known to those of skill in the art. The sensors 104 can be used to collect or measure data and transmit that data to other computing devices, such as receivers 106, for further storage and/or processing. Sensors 104 can be equipped with any of: (1) a sensing unit configured to perform the sensing, measuring and/or data collecting for the sensor; (2) a processor including logic; (3) communications means (e.g., an antenna); and (4) a power source. As described in greater detail below, a power source can be an electromagnetic field from another portion of the ecosystem 100, such as a transmitter 102 or receiver 106. The sensors 104 themselves can be tags, and in the embodiments described herein a sensor of the sensors 104 is a backscatter tag configured to provide a frequency-shifted Backscatter. For example, as described in greater detail below, the logic for backscatter tags provided for herein is operatively connected to a clock generator, and the clock generator shifts a frequency of a signal that is received and transmitted by one or more of the sensors 104.

Backscatter Reader and Backscatter Tag Configuration

FIG. 2 illustrates a system 200 that includes a backscatter reader 220 and a backscatter tag 240. The backscatter reader 220 is designed to be both a transmitter and a receiver, although in other illustrated embodiments these functions are separated into two separate devices. In the illustrated embodiment, a transmission portion 220t serves as a transmitter and a receiver portion 220r serves as a receiver. Further, the backscatter reader 220 can provide an electromagnetic field to the backscatter tag 240, which the tag uses for both power and as a communication medium. That is, the energy contained in the incoming electromagnetic field can be used to draw energy and can be partially modulated and reflected back to a receiver, thereby communicating information. As a result, the backscatter tag 240 does not require a separate power source, thus allowing the backscatter tag 240 to be small in comparison to sensors and tags that require an on-board power source to be operational.

The transmission portion 220t of the backscatter reader 220 includes a transmitter 222, a lamp 224, and amplifier 226, and an antenna 228, and a receiver portion 220r of the reader 220 includes a receiver 262, a lamp 264, a low-noise amplifier 266, and an antenna 268. The transmission portion 220t and the receiver portion 220r are connected to a sinusoidal generator 230. Meanwhile, the lamps 224, 264 are used to indicate whether the transmission portion 220t or the receiver portion 220r are currently being used. Typically only one or the other portion 220t, 220r is operated at a time to achieve peak performance of that operating portion of the backscatter reader 220. In use, the transmitter 222 can transmit a signal that is representative of data. The data can be measured by some sensor (not shown) associated with the reader 220, or it can otherwise be provided to the reader 220. The signal is sent across the lamp 224, to the amplifier 226, where the signal is amplified. The amplified signal is transmitted to a location beyond the reader 220 via the antenna 228 in the form of a sine wave. The transmitted signal is illustrated as a carrier wave 280, and, as shown, is transmitted to the backscatter tag 240. Sometimes the transmitted signal is referred to as an incident signal, a carrier signal, and/or an incident carrier signal, among other terminology known to those skilled in the art.

The backscatter tag 240 includes an antenna 248, a radiofrequency (RF) harvester 242, transmission logic 244, a push button or momentary switch 246, and a radiofrequency transistor 250, and is generally designed to reflect (also referred to as transmit in the present disclosure) the received signal to a receiver (as shown, the receiver portion 220r of the backscatter reader 220) after conditioning the signal in some manner. The tag 240, as with all of the backscatter tags provided for herein, is configured to use backscatter modulation and electromagnetic coupling to enable far-field coupling relative to near-filed communication mechanisms. The backscatter tag 240 receives the signal of the carrier wave 280 by way of the antenna 248, which can be operatively connected or coupled to the RF transistor 250. The RF harvester 242 can harvest energy from the electromagnetic field created by the reader 220 to help power the backscatter tag 240. The transmission logic 244 toggles the transistor 250, by way of the switch 246, based on the data that is transmitted and to embed information, such as data measured or otherwise provided by the tag 240, on top of the reflected signal. The transistor 250 can be configured to transmit a signal across any frequency band, and the decision at which band to transmit can depend, at least in part, on the band in which the incident carrier signal was transmitted, any existing interference that exists in other channels, and regulations established by a location where the transmission is occurring (e.g., country wireless transmission regulations). Because the backscatter tag 240 merely reflects the incident signal, the tag consumes three to four orders of magnitude less power when compared to direct wireless signal transmission, thus enabling the tag to transmit data at extremely low power (e.g., 50 microwatts or less).

The reflected signal, illustrated as a carrier wave 282, is transmitted back to the backscatter reader 220. In alternative embodiments, including but not limited to some provided further below, the reflected signal is transmitted to a receiver associated with a device or component that is separate from the device or component that transmitted the incident carrier signal. In the illustrated embodiment, the receiver portion 220r receives the reflected signal via the antenna 268, and passes it through the low-noise amplifier 266 so that the reflected signal can be amplified before reaching the receiver 262. The signal is sent across the lamp 264, which can be lit to indicate the receiver portion 220r is in operation, and delivered to the receiver 262. The receiver 262 can read the received, reflected signal and process the associated data in any known manner. For example, the receiver 262 can display the data and/or use the data to trigger some particular action in response to the data.

A person skilled in the art will recognize at least some of the components illustrated in the electronic circuit diagrams of FIG. 2 are optional and/or can be replaced by other components. By way of non-limiting example, the lamps 224, 264 can be removed in some instances.

Separate Backscatter Transmission and Receiver Devices

FIG. 3 illustrates one exemplary configuration of a system 300 that includes a separate transmitter 320 and receiver 360 used in conjunction with a tag 340. The illustrated tag is an RF tag, or an RF identification (RFID) tag. Other configurations of tags can be used in a similar set-up, including the tag 240, as well as other tags provided below. Tags provided below include tags having at least some of the following components: (1) an integrated circuit for storing, processing, modulating, and/or demodulating a signal; (2) an antenna for receiving and transmitting a signal; (3) a transistor coupled to the antenna; (4) a modulator or transmission logic; and (5) a low-power oscillator. In the illustrated embodiment, the tag 340 receives its incident signal, shown as a carrier wave 380, from the transmitter TM-B, and the tag 340 reflects its modulated signal, shown as a carrier wave 382, to the receiver REC-B. Further, at least one of the transmitter TM-B and the receiver REC-B can provide an electromagnetic field to the backscatter tag 340 for use to both power the tag and for the tag to use as a communication medium, similar to the electromagnetic field provided for by the backscatter reader 220 and as other set-ups involving transmitters, receivers, backscatter tags, and the like provided for herein or otherwise derivable from the present disclosures.

As discussed above with respect to FIG. 2, backscatter tags (e.g., the tags 240 and 340, and others described below) can be small in size because they do not include a power source. This, in turn, limits the amount of power that can be used to operate features of a tag. While some tags may include Bluetooth (e.g., BLE) and Wi-Fi functionality, backscatter tags like those provided for herein does not include such transmission components. Instead it uses backscatter coupling to transmit data.

While employing backscatter coupling allows the tag 340 to be powered by an incoming electromagnetic field, for instance an electromagnetic field of the receiver REC-B, the tag 340 can run into interference issues if the channel in which the backscatter coupling communicates overlaps with the signals that are generated by the transmitter TM-B and/or the receiver REC-B when those components are communicating with the tag (i.e., when the transmitter TM-B is sending the incident signal to the tag 340 by way of a Bluetooth or Wi-Fi communication and/or when the receiver REC-B is tuned or is otherwise listening to receive the signal reflected by the tag 340 by way of a Bluetooth or Wi-Fi communication). This is illustrated in FIG. 4, in which a Bluetooth or Wi-Fi signal, illustrated as signal 384, from either or both of the transmitter TM-B and receiver REC-B share the same frequency band as the backscatter signal generated by the tag 340, illustrated as signal 386. Notably, the power from the Bluetooth or Wi-Fi signal(s) 384 is approximately three to four times greater than the power of the backscatter signal 386, thus causing strong interference to the backscatter signal 386. For example, the receiver REC-B cannot effectively isolate the backscatter signal 386 while eliminating the Bluetooth or Wi-Fi signals 384.

A person skilled in the art will recognize that a frequency band across which data can be transmitted across a wireless local area network (WLAN) is defined by channels using IEEE 802.11 protocols. Currently there are five documented and distinct frequency ranges: 2.4 gigahertz, 3.6 gigahertz, 4.9 gigahertz, 5 gigahertz, and 5.9 gigahertz, with each range being divided into a plurality of channels. The use of the channels is generally regulated on a country-by-country basis, with the regulations pertaining to identifying the permissible channels for use, the types of users allowed to use the permissible channels, and the maximum power levels allowed within the designated frequency range of the channel. Most countries, including the United States, use the 2.4 gigahertz WLAN frequency range and have 14 channels designated within a frequency range of 2.4 gigahertz and 2.5 gigahertz. The channels have a width of about 22 megahertz, and there is a 5 megahertz spacing between the start of each channel, except for channel 14, which is spaced 12 megahertz from channel 13. Thus, many of the channels overlap with each other. In the United States, as with most countries, there can be up to four channels that do not overlap—channels 1, 6, 11, and 14—although the United States, as with most countries, do not presently typically allow for channel 14 to be used. The United States, unlike most other countries, also restricts the use of channels 12 and 13. To the extent channels 12 and 13 are able to be used in countries, it is often at lower power thresholds than channels 1-11.

To minimize or even eliminate the interference issues that exist in the above-described transmitter-backscatter tag-receiver set-up, backscatter tags provided for herein are configured to shift the frequency band in which the signal is reflected prior to directing the signal to the receiver. As shown in FIG. 5, the frequency band in which the backscatter tag is transmitted, illustrated as a signal 386', is different than the frequency band in which any of the Bluetooth or Wi-Fi signals from the transmitter and receiver are transmitted, again illustrated as a signal 384. By way of non-limiting example, in one embodiment, the transmitter can transmit in channel 6 and the smartwatch can receive in channel 11, with the tag shifting the frequency band of the incident signal transmitted by the transmitter from channel 6 to channel 11, thus allowing the backscattered signal received by receiver in channel 11 to not be interfered with by the transmission signal from the transmitter. In general, it can be beneficial for the backscatter tag to shift a signal to a frequency band that does not overlap with the frequency band in which the incident carrier signal was transmitted to avoid interference. That frequency band can be the next lower non-overlapping frequency band of a channel in which the incident carrier is transmitted, or the next higher non-overlapping frequency band of the channel in which the incident carrier is transmitted. Additional details about the amount of frequency shift are provided for below, but generally the frequency shift can be at least approximately 20 megahertz.

FIG. 6 illustrates one exemplary embodiment of an electronic circuit 400 of a receiver 460 that includes filters 470, 472. While a person skilled in the art will recognize that receivers can have many different electronic configurations and can include many different features, the RF filter 470 and the baseband filter 472 help condition the received reflected signal. More particularly, the RF filter 470 is configured to operate on signals having medium to high frequencies, and helps pass only frequencies that are required through the illustrated circuit 400, while eliminating unneeded frequencies, thus keeping noise to a minimum. The baseband filter 472, meanwhile, is configured to only allow frequencies between a set interval range to pass through the circuit 400. Thus, each of the filters 470, 472 can be used to help eliminate signals from other channels to the extent they may still interfere after the frequency shift. Similar to the receiver portion 220r, the receiver 460 also includes an antenna 468, a low-noise amplifier 466, and a lamp 464, and is in electrical communication with a sinusoidal generator 430. As further shown, data 474 from the receiver 460 can also be filtered, such as by the baseband filter 472. Although the circuit 400 of FIG. 6 is described as a receiver, a person skilled in the art, in view of the present disclosures, would understand that similar features can also be incorporated into a transmitter to help filter a signal prior to transmitting the incident carrier wave. Likewise, as with the other electronic circuit diagrams provided for herein, a person skilled in the art will recognize various illustrated components (e.g., the lamp 464, filters 470, 472, etc.) may be optional and/or can be replaced by other components without departing from the spirit of the present disclosure.

Backscatter Tag

A backscatter tag can have a number of different configurations. One such configuration is provided above with respect to the backscatter tag 240. More generally, backscatter tags of the present disclosure provide for at least three subsystems: (1) an RF transistor; (2) a transmission logic or modulator; and (3) a clock generator. The RF transistor and transmission logic are described above with respect to the tag 240, and are further discussed below with respect to a backscatter tag 640. A clock generator, which provides a clock for timing the whole system (e.g., the tag plus other components, such as a transmitter(s) and receiver(s)) to enable frequency shifting of the incident signal, is described in further detail below with respect to FIGS. 8-10.

As described above, a key functionality of the backscatter tag is to shift the frequency band of the incident carrier signal to a different frequency band. For example, the tag can increase a rate of tag transmission, and thus the spectrum occupied by the backscattered signal moves away from the Wi-Fi and/or Bluetooth signal, as shown in FIG. 5, in accordance with the relationship that the backscatter signal is a product between the Wi-Fi and/or Bluetooth signal and the tag data: backscatter(t)=Wi-Fi(t)×tag(t) (or Wi-Fi(t) being Bluetooth(t)). By way of example, a spectrum when a backscatter tag in accordance with the present disclosures backscatters a Bluetooth signal 388 is provided in FIG. 7. As shown, the incident Bluetooth signal 388 is transmitted by a transmitter at about 2.44 gigahertz, and the resultant frequency-shifted Backscatter signal 390 transmitted by the backscatter tag is about 20 megahertz away in both directions.

While a key functionality of the backscatter tag is providing the aforementioned shift, the tag can also encode information into the shifted signal. This information can be, for example, information measured or otherwise generated by the backscatter tag (e.g., an on-body sensor), or information passed from some other location to the backscatter tag for purposes of encoding the information into the shifted signal. Encoding information into the shifted signal can be achieved in at least two different manners, with each manner being achievable in any of the backscatter tags provided for in the present disclosure.

One way by which information can be encoded into the shifted signal, sometimes referred to modulating information, is to encode at a packet-level. In such instances, for each Bluetooth or Wi-Fi packet, the tag can either tune its antenna and reflect the packet to the receiver, or detune its antenna and not reflect the packet to the receiver. As a result, the receiver can detect the presence or absence of the reflected packet to obtain the tag information. The speed of the transmission to the receiver is limited by the packet rate of the packet in this instance.

A second way by which information can be encoded into the shifted signal is to encode at a bit-level. In such instances, instead of tuning or detuning an entire packet, the tag can selectively reflect or not reflect a bit of the packet. The receiver can use low-level signal strength information to recover the transmitted bits, and can obtain the tag information based on the presence or absence of bits. The speed of the transmission to the receiver is faster than the packet-level methodology because bit-rates are higher than packet-rates, although a range of communication between the tag and the receiver is less than the packet-level methodology because, unlike the packet-level modulation, the receiver in the bit-level modulation is not able to leverage the entire packet structure, such as a Bluetooth preamble and checksums, for decoding. By way of non-limiting examples, in some embodiments packet-level modulation has occurred at up to hundreds of bits per second (e.g., approximately 400 bits per second) and up to a range of about 50 meters, while bit-level modulation has occurred at up to 50 kilobits per second and up to a range of about 3.8 meters. Data transmission rates for the backscatter tags provided for in the present disclosures can be approximately in a range of about 100 bits per second to about 50 kilobits per second, and distances between which the backscatter tags provided for in the present disclosures can effectively transmit data to a receiver can be approximately in the range of about 0.5 meters to about 50 meters, with the range for bit-level modulation between about 0.5 meters to about 3.8 meters. A person skilled in the art will recognize that other data transmission rates and distances are achievable.

A clock generator provides the clock for timing a system involving a transmitter, backscatter tag, and a receiver. FIG. 8 provides one exemplary embodiment of an electronic circuit 500 of a clock generator 552. More particularly, the clock generator 552 is a ring oscillator having an odd number of inverters 554 connected in a serial sequence. Because there is an odd number of inverters 554, a last stage inverter, shown as inverter 554e, outputs a signal that has a reversed logic as compared to the input of the first stage inverter, shown as inverter 554a, and thus the whole circuit can oscillate. The reversed logic of the clock generator 552 is illustrated in FIG. 8 by way of the alternating "+" and "−" symbols. The frequency of the ring oscillator dictates the size of the signal shift, often on a 1:1 scale, i.e., the frequency of the ring oscillator is equal to the amount the incident signal is shifted by the tag. Although FIG. 8 illustrates five inverters 554, other odd numbers of inverters is feasible, including three inverters.

The frequency of the ring oscillator 552 is determined by the propagation delay of each inverter 554. FIG. 9 provides one exemplary embodiment of an electronic circuit 556 of one of the inverters 554. As shown, the circuit 556 includes two positive-channel metal-oxide semiconductor (PMOS) and negative-channel metal-oxide semiconductor (NMOS) transistors 558, 559 having adjustable gate voltages $V_{pc}$ and $V_{nc}$, respectively, such that adjusting the gate voltage adjusts the propagation delay. Further, a resistor-capacitor (RC) circuit can be disposed between the inverters 554 to provide additional delay. A person skilled in the art will recognize how the gate voltages $V_{nc}$ and $V_{pc}$ and parameters of an RC circuit can be tuned to achieve desired delays, e.g., 20 megahertz.

While other types of oscillators can be used to drive the frequency shift, the amount of power needed to achieve a 20 megahertz shift with other types of oscillators is typically significantly more than is needed with the ring oscillator 552. For example, many oscillators would consume a few milliwatts of power to achieve a 20 megahertz frequency shift. This amount of power is significantly higher than the amount of power consumed by the rest of the backscatter tag, which can be only a few microwatts. Such a difference in power consumption is not efficient.

Ring oscillators are not the only type of oscillator capable of operating at a low power and a high frequency. However, other low power/high frequency oscillators typically result in the introduction of undesirable amounts jitter and noise into the system. To the extent ring oscillators do suffer from issues, such as the oscillating frequency being sensitive to temperature variations, the impact can be miniscule in certain uses, including in the present context. For example, when a backscatter tag incorporating the ring oscillator 552 is used as an on-body or otherwise wearable sensor, the sensitivity has very little effect because of the ability of the human body to regulate temperature. As shown in FIG. 10, temperature variation for the human body is typically less than one degree, even when sweating and performing physical exercise due to thermal regulation. As shown in FIG. 11, this small variance in temperature variation results in only about 200 kilohertz of frequency offset for the normal human body temperature. Throughput degradation does not begin until the frequency offset is larger than about 500 kilohertz. Thus, in the provided for backscatter tags incorporated into on-body or otherwise wearable sensors that use bit-level modulation, the throughput for the system is maintained at a stable value of approximately 50 kilobits per second. Further, even if a packet-level decoder does not work when the tag is not attached to the body or when the temperature swing is large, a bit-level decoder that uses Received Signal Strength Indicator (RSSI) information can still be utilized. This is because Bluetooth channels are approximately 2 megahertz art, so a temperature-compensated decoder can listen on the appropriate channel where the backscatter signal is strongest.

FIG. 12 illustrates one exemplary embodiment of an electronic circuit 600 of a backscatter tag 640 that results from the disclosures provided for herein. As shown, the backscatter tag 640 includes a clock generator 652 in the form of a ring oscillator having three inverters 654 connected in serial sequence to shift a frequency of a received incident signal. Control voltages for the PMOS and NMOS transistors (not shown) of the inverters 654 can be Vpc=0.1 Volts and Vnc=0.75 Volts, respectively. The clock generator 652 can include one or more RC circuits (e.g., R=1.008K, C=1.84 picofarads) to provide additional delay. The clock generator 652 is electrically connected or coupled to a modulator 644, also referred to herein as the transmission logic, which is electrically connected or coupled to an RF transistor 650 (e.g., an ADG902 RF transistor, available from Analog Devices of Norwood, Mass.). The modulator 644 includes a gate 645 and an input 647 to receive transmitter data, such as data transmitted from a smart device operating as a transmitter. The gate feeds into a push button or momentary switch 646, thereby allowing the modulator 644 to toggle the RF transistor 650 based on the data that is transmitted and embed information, such as data measured or otherwise provided by the tag 640, on top of the frequency-shifted, modulated signal that is reflected by the tag 640. An antenna 648 can be used to communicate the frequency-shifted, modulated signal to a receiver, such as another smart device that is part of a computing device ecosystem.

The tag 640 can be further optimized by reducing the voltage range in which the tag operates, thereby reducing its power consumption. While the minimum voltage needed for powering an ADG902 RF transistor is $V_{DD}$=1.65 Volts, a 1.65 Volt signal does not need to be fed into the gate 645 for operating the switch 646 to open and close the gate. In fact, the switch 646 of the ADG902 RF transistor can be opened and closed by switching between 0.65 $V_{DD}$ (i.e., 1.0725 Volts as described herein) and 0.35 volts. Thus, rather than switching between 1.65 Volts and 0 Volts, switching can be between 1.0725 Volts and 0.35 Volts to toggle the RF transistor 650.

Likewise, the clock generator 652 and data modulator 644 do not have to be run at a high voltage either. These two subsystems can be operated at 0.8 Volts and still be effective. Then a 0.3 Volt voltage shifter can be used to move the 0.8 Volt/0 Volts signal output by the modulator to 1.1 Volts/0.3 Volts, which is high enough for toggling the RF transistor 650. By operating the clock generator 652 and modulator 644 at 0.8 Volts, the overall system power consumption can be significantly reduced. In view of the control voltages (Vpc=0.1 Volts and Vnc=0.75 Volts) and RC circuit (e.g., R=1.008K, C=1.84 picofarads) provided for above, and the rest of the tag 640 configuration, using 0.8 Volts to drive the PMOS and NMOS transistors (not shown) inside of the clock generator 652 can result in a 20.006 megahertz oscillating frequency, which is accurate enough for modulating information as desired. An additional number of inverters, in some exemplary embodiments two, can be added to help shape the signal output by the clock generator 652. A person skilled in the art will recognize that other tag designs, and other power configurations, can be used to operate backscatter tags in accordance with the teachings provided for herein.

The power consumed by the tag 640 is significantly less than existing comparable technologies. This is due, at least in part, to the reduced voltage used to operate the clock generator 652 and the data modulator 654. By way of example, in view of the provided for embodiment, the power consumption of the aspects of the tag can be approximately as follows: 20.8 microwatts for the clock generator 652, 0.1 microwatts for the data modulator 644, and 24.1 microwatts for the RF transistor 650 with DC voltage shifting, resulting in an overall tag power consumption of approximately 45 microwatts. Generally the present disclosures enable for tag power consumption to be approximately 50 microwatts or less, although a person skilled in the art will recognize this result is dependent on a variety of factors, including the electronic components of the tag 640 and the configuration of such components. An overall tag power consumption of 45 microwatts is more than three orders of magnitude lower than the amount of power consumed when no voltage shift occurs and the voltage is not actively reduced (in which the power consumption of the components is approximately: 78 microwatts for the clock generator 652, 11.5 microwatts for the data modulator 644, and 57.1 microwatts for the RF transistor, resulting in an overall tag power consumption of approximately 146.6 microwatts—approximately 3.25 times greater than the provided for tag).

FIG. 13 illustrates one, non-limiting exemplary embodiment of a backscatter tag 740, illustrated as an FS-Backscatter radio analog front end. A person skilled in the art will recognize many other ways a backscatter tag can be configured in view of the present disclosures, as well as many other comparable electronic components that can be used in place of those provided for in tag 740. In particular, the tag 740 is designed to be flexible to allow different types of antenna to be connected to it, and thus in other configurations a more integrated antenna, and related components, can be utilized. The flexibility to allow for different antennas to be connected to the tag 740 is provided in the illustrated embodiment by a SubMiniature version A (SMA) connector 757 that is connected an ADG902 RF transistor 750. The transistor 750 is configured to tune and detune an antenna coupled thereto by way of the SMA connector 757. Some not-limiting examples of antennas that can be used with the tag 740 include a VERT2450 antenna (available from Ettus Research, a company of National Instruments Corporation of Santa Clara, Calif.) and a TL-ANT2409A 2.4 gigahertz antenna (available from TP-Link Technologies Co., Ltd. of Brea, Calif.), each of which is capable of reflecting 2.4 gigahertz wireless signals in accordance with the present disclosures. A person skilled in the art will recognize that a more integrated antenna should result in performance improvements for the tag 740 because matching circuits can be better tuned for a specific, integrated antenna. In some embodiments involving a Wi-Fi backscatter, a 9 dBi directional gain antenna can used with the tag 740 since generally a monopole antenna does not work with a Wi-Fi backscatter, while in some other embodiments a standard 3 dBi omnidirectional antenna can be used with the tag 740.

Backscatter tags such as those provided for in the present disclosure can be embedded or otherwise used in conjunction with most any object, including virtually anything worn, touched, used, or even ingested. The use can occur in any computing device ecosystem, such as the ecosystem 100, the Internet-of-Things, etc., implantable sensors, wearables, mobile devices, urban sensing, and others.

Transmitters and Receivers

Transmitters and receivers used in conjunction with the backscatter tags provided for in the present disclosure can be standard radios with standard antennas, thus allowing the backscatter tags of the present disclosures to be used with existing devices (e.g., smart devices and the like, as provided for herein or otherwise known to those skilled in the art). The transmitters and receivers can be equipped with standard onboard chips and/or PCB antennas. By using existing devices, a transmitter can simply be any device having the ability to transmit a Bluetooth/BLE, Wi-Fi, or other comparable signal for a continuous period of time in a specified channel. Likewise, a receiver can simply be any device having the ability to receive and decode information from a transmitted or reflected carrier signal. By way of non-limiting example, a receiver can include a TI CC3200 Wi-Fi microcontroller/receiver and/or a TI CC2650 BLE microcontroller/receiver (both available from Texas Instruments of Dallas, Tex.) for purposes of performing packet-level decoding, and/or a TI CC2541 BLE microcontroller/receiver (also available from Texas Instruments) for purposes of performing bit-level decoding. The CC2541 BLE microcontroller/receiver can support a normal BLE mode, as well as a proprietary mode that bypasses the Bluetooth stack and allows for direct access of the channel RSSI.

In one exemplary method of use, the systems can be set-up such that when an incident Wi-Fi signal is on the ith channel and a Bluetooth/BLE signal is on the jth channel, the TI CC3200 microcontroller/receiver and the CC2650/CC2541 microcontrollers/receivers can be configured to detect packets on the i+nth and j+nth channels where n indicates the number of channels shifted by the FS-Backscatter tag. Signals detected by each radio can be reported to the joint decoder for deciding the actual bit transmitted by the tag. The combination of the CC3200, CC2650, and CC2541 microcontrollers/receivers can be advantageous because they have similar sensitivity (approximately −95 decibels per milliwatt) for detecting a backscattered signal.

While existing transmitters and receivers can be used, a person skilled in the art will recognize that it may be advantageous to modify existing transmitters and receivers to improve performance in view of the provided disclosures. For example, a receiver may be modified to allow it to operate as a high-rate backscatter receiver by creating or modifying a smart device (e.g., activity tracker or smartwatch) that swaps BLE chipsets to use one with low-level channel access, or which can otherwise provide application programming interface (API) access to the raw channel RSSI values.

Still further, multiple transmitters and/or receivers can be used to further enhance performance of certain backscatter tags by improving a robustness of a backscattered signal since backscatter signals may be weaker and more sensitive to noise than an incident signal. For example, a backscatter tag having an analog RF front end having an RF transistor can receive signals from multiple transmitters and/or reflect the backscatter signal to multiple receivers because the tag does not include any filters to limit the band where the radio can operate. Thus, the tag can reflect multiple incident signals at the same time so long as the signals can resonate with the backscatter antenna(s). For example, because Wi-Fi, Bluetooth, Zigbee, and other ISM-band radios typically share the same 2.4 to 2.483 gigahertz spectrum, a backscatter tag can reflect some combination of them at the same time. This capability provides several benefits in which multiple ambient carriers and multiple receivers can be leveraged to enhance backscatter performance in view of the present disclosures.

For example, multiple transmitters can turn off carrier sensing and broadcast in the same band to increase the reflected signal strength. This provides a boosted backscatter signal strength in the shifted channel. Such capabilities would not be possible using amplitude-shift keying backscatter since the additional transmitter would result in additional interference due to the signals being in the same channel. Likewise, multiple receiver can combine the signals to improve decoding performance. In some exemplary embodiments in which RSSI information is not restricted to coming from the radio, the analog signals can be combined via maximal ratio combining. Many commercial receivers are restricted to the RSSI information coming from the radio, and thus cannot be combined via maximal ratio combining. Nevertheless, two (or more) receivers can be employed (e.g., by placing them near each other, such as approximately 0.2 meters away from each other) to measure the signal strength (RSSI) of a backscatter bit on each receiver, and exchange the information. The signal strength received by each receiver can be added to determine the actual bit transmitted by the tag, thus improving the throughput of the system. This is because the reflected signal at one receiver may be strong while the reflected signal at the other weak, and by combining the determinations by the two receivers, joint decoding is helpful and improves the signal-to-noise ratio (SNR).

Backscatter Methods

In use, a backscatter tag (e.g., tags 140, 240, 340, 640, 740) is configured to receive a carrier signal (such as from one or more transmitters) that is transmitted in a first frequency band. As described above with respect to a computing device ecosystem 100, the backscatter tag can be part of a sensor located on a body of a user, such as a wearable sensor adhered to the skin in some fashion. The first frequency band can be any known band, but in some embodiments, that band is a fixed band or channel, such as channel 6 of the IEEE 802.11 protocols for WLANs. Communication with the backscatter tag can be achieved by way of an antenna or other components known by those skilled in the art for receiving a carrier signal. The tag can shift a frequency band of the received signal. The shift can be made to a second frequency band that is different than the first frequency band (e.g., it has at least some different frequencies in the second band than the first band, or, alternatively, it has no overlapping frequencies between the two bands). The second frequency band can be a predetermined frequency band and/or a fixed frequency band. For example, the second frequency band can be another channel of the IEEE 802.11 protocols for WLANs, such as channel 1 or channel 11, which are the next lower and higher non-overlapping frequency bands for channel 6. In some instances, the shift can be approximately 20 megahertz, meaning that the difference between the first, initial frequency band in which the carrier signal is transmitted and the second frequency band to which the tag shifted the carrier signal is about 20 megahertz.

After the frequency band in which the carrier signal is transmitted is shifted, the tag can transmit, i.e., reflect, the carrier signal in the second frequency band. Because of the shift, the second frequency band is substantially free of signal interference. A frequency band that is substantially free of signal interference is a band in which there is either no signal interference, or, to the extent that there is any signal interference, it has no significant impact on decoding the information in the signal. While a person skilled in the art will understand what an acceptable lack of interference would be, in some instances in may be quantified as interference that causes a severe degradation of the signal.

The signal that is transmitted or reflected in the second frequency band can also include additional information embedded in the signal by the tag. The information can be information that is measured or generated by the tag, such as information measured by a sensor associated with the tag, or it can be other information provided in some way to the tag, such as by an outside sensor or database. The information can be embedded prior to, during, or after the signal is shifted by tag, and it can be embedded using various techniques known to those skilled in the art for performing such actions. In some instances, information is added to the second signal by performing on-off keying to add digital information to the carrier signal.

One particular benefit to the frequency-shifting methods provided for in the present disclosure is that they can be performed using minimal amounts of power, sometimes referred to as being "ultra-low power." For example, the backscatter tags provided for use in the present disclosure can be operated at approximately 50 microwatts or lower to shift the frequency band, and such ultra-low power consumption is achievable even when the tag embeds additional information into the signal. One way by which this ultra-low power can be achieved is by operating a ring oscillator as part of the backscatter tag. In a similar vein, the action of transmitting the carrier signal in the second frequency band can involve a power consumption that is at or below about 50 microwatts.

Components used in conjunction with the backscatter techniques provided for in the present disclosure include transmitters and receivers. As a result, use of the backscatter tag can include actions such as transmitting the carrier signal in the first frequency band, which is typically performed by one or more transmitters, and receiving the carrier signal that is transmitted in the second frequency band, which is typically performed by one or more receivers. As described above, using multiple transmitters and/or multiple receivers can enhance the performance of the backscatter since backscatter signals can be weaker than initial signals prior to being backscattered. For example, when operating multiple transmitters to transmit an incident carrier signal, the transmitters can be configured to transmit in the first frequency band without causing significant signal interference for the carrier signal transmitted in the second frequency band. By way of further example, when operating multiple receivers to receive the carrier signal that is transmitted or reflected by the backscatter tag, the receivers can be configured to measure a strength of a backscatter bit of the received carrier signal. The strength of each of the measured bits can be added together to determine an actual bit of the carrier signal that is transmitted in the second frequency band.

The signals can be transmitted from the transmitter using Bluetooth, BLE, Wi-Fi, Zigbee, ISM-radio bands, and other techniques for wirelessly transmitting carrier signals representative of data. These same techniques can be used to receive the second, reflected carrier signal. While transmitters and receivers can use different wireless transmission techniques between the two in the same system (e.g., transmitter-backscatter tag-receiver), often both the transmitter and receiver operate using the same wireless transmission technique.

The use of frequency-shifted Backscatter is preferable to techniques such as amplitude-shift keying (ASK) and frequency-shift keying (FSK) modulation methods to transmit a carrier signal from a transmitter to a receiver because it reduces the impact of interference. This is at least because ASK and FSK methods are performed in the same channel.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for transmitting data, comprising:
providing a backscatter tag, the backscatter tag comprising:
a ring oscillator having an oscillator output; and
a gate having a clock input and a data input;
receiving at the backscatter tag a carrier signal, the carrier signal being transmitted in a first frequency band;
operating the backscatter tag to shift a frequency band in which the carrier signal is transmitted to a second frequency band by providing, to the gate, data to the data input of the gate and a clock signal from the oscillator to the clock input of the gate; and
transmitting the carrier signal in the second frequency band,
wherein the second frequency band is substantially free of signal interference.

2. The method of claim 1, wherein the second frequency band is a predetermined frequency band.

3. The method of claim 2, wherein the predetermined frequency band is located at either a next lower non-overlapping frequency band of a channel in which the received carrier signal is transmitted, or a next higher non-overlapping frequency band of the channel in which the received carrier signal is transmitted.

4. The method of claim 2, wherein the predetermined frequency band is a fixed frequency band.

5. The method of claim 1, wherein a difference between the first frequency band and the second frequency band is approximately 20 megahertz.

6. The method of claim 1, further comprising performing on-off keying to transfer information to the carrier signal that is transmitted in the second frequency band.

7. The method of claim 1, wherein the backscatter tag is configured to operate at approximately 50 microwatts or lower when shifting the frequency band in which the carrier signal is transmitted to the second frequency band.

8. The method of claim 1, wherein transmitting the carrier signal in the second frequency band has a power consumption that is at or below about 50 microwatts.

9. The method of claim 1,
wherein each of receiving the carrier signal, shifting the frequency band in which the carrier signal is transmitted to the second frequency band, and transmitting the carrier signal in the second frequency band is performed by a sensor located on a body of a user.

10. The method of claim 1, further comprising:
transmitting the carrier signal in the first frequency band, the carrier signal being the carrier signal that is received; and
receiving the carrier signal that is transmitted in the second frequency band.

11. The method of claim 10,
wherein transmitting the carrier signal in the first frequency band is performed by a first smart device configured to transmit the carrier signal by at least one of Bluetooth or Wi-Fi, and
wherein receiving the carrier signal that is transmitted in the second frequency band is performed by a second smart device configured to receive the carrier signal by at least one of Bluetooth or Wi-Fi.

12. The method of claim 11,
wherein the first smart device transmits the carrier signal by one of Bluetooth or Wi-Fi, and the second smart device receives the carrier signal by one of Bluetooth or Wi-Fi, and
wherein selection of the Bluetooth or the Wi-Fi is the same for the first smart device and the second smart device.

13. The method of claim 10, wherein transmitting the carrier signal in the first frequency band and transmitting the carrier signal in the second frequency band are performed without amplitude-shift keying or frequency-shift keying to transfer information in either the first or second frequency bands.

14. The method of claim 10, wherein transmitting the carrier signal in the first frequency band is performed by a plurality of smart devices, the plurality of smart devices being configured to transmit in the first frequency band without causing significant signal interference for the carrier signal transmitted in the second frequency band.

15. The method of claim 10, wherein receiving the carrier signal that is transmitted in the second frequency band is performed by a plurality of smart devices, each of the plurality of smart devices being configured to measure a strength of a backscattered bit of the received carrier signal, the method further comprising adding the strength of each of the backscattered bits to determine an actual bit of the received carrier signal transmitted in the second frequency band.

16. A backscatter tag, comprising:
a radio frequency transistor;
transmission logic configured to receive data to be transmitted and to toggle the radio frequency transistor based on the data to be transmitted, the transmission logic comprising a gate having a data input and a clock input; and
a ring oscillator configured to provide a clock to the clock input of the transmission logic and configured to shift frequency of an incident carrier from a first frequency band to a second frequency band in view of the transmission logic, the second frequency band being substantially free of signal interference.

17. The backscatter tag of claim 16, wherein the second frequency band is a predetermined frequency band.

18. The backscatter tag of claim 17, wherein the predetermined frequency band is located at either a next lower non-overlapping frequency band of a channel in which the incident carrier is transmitted, or a next higher non-overlapping frequency band of the channel in which the incident carrier is transmitted.

19. The backscatter tag of claim 17, wherein the predetermined frequency band is a fixed frequency band.

20. The backscatter tag of claim 16, wherein the ring oscillator is configured to shift the frequency of the incident carrier from the first frequency band to the second frequency band prior to transmitting the data to the radio frequency transistor.

21. The backscatter tag of claim 16, wherein the transmission logic and the ring oscillator are configured to operate at approximately 0.8 Volts or less.

22. A method for transmitting data, comprising:
receiving a carrier signal, the carrier signal being transmitted in a first frequency band;
operating a backscatter tag to shift a frequency band in which the carrier signal is transmitted to a second frequency band; and
transmitting the carrier signal in the second frequency band,
wherein the second frequency band is substantially free of signal interference, and wherein transmitting the carrier signal in the first frequency band and transmitting the carrier signal in the second frequency band are performed without amplitude-shift keying or frequency-shift keying to transfer information in either the first or second frequency bands.

* * * * *